(12) United States Patent
Sato et al.

(10) Patent No.: US 9,791,845 B2
(45) Date of Patent: Oct. 17, 2017

(54) WORKPIECE-ATTACHMENT-INFORMATION REPORTING DEVICE

(71) Applicant: MAKINO MILLING MACHINE CO., LTD., Tokyo (JP)

(72) Inventors: Hitoshi Sato, Tokyo (JP); Yasunori Masumiya, Aiko-gun (JP); Naohito Toida, Tokyo (JP); Yuki Tanigawa, Tokyo (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 208 days.

(21) Appl. No.: 14/438,244

(22) PCT Filed: Oct. 30, 2012

(86) PCT No.: PCT/JP2012/078056
§ 371 (c)(1),
(2) Date: Apr. 24, 2015

(87) PCT Pub. No.: WO2014/068677
PCT Pub. Date: May 8, 2014

(65) Prior Publication Data
US 2015/0277419 A1    Oct. 1, 2015

(51) Int. Cl.
*G06F 19/00* (2011.01)
*G05B 19/19* (2006.01)
(Continued)

(52) U.S. Cl.
CPC .......... *G05B 19/19* (2013.01); *B23Q 15/013* (2013.01); *G05B 19/4068* (2013.01); *G05B 2219/35349* (2013.01); *G05B 2219/50047* (2013.01)

(58) Field of Classification Search
CPC ............... G05B 19/19; G05B 19/4068; G05B 2219/35349; G05B 2219/50047; B23Q 15/013
(Continued)

(56) References Cited

U.S. PATENT DOCUMENTS

2007/0236163 A1* 10/2007 Heertjes ................. G05B 19/19
  318/619
2012/0330456 A1    12/2012 Tsuda et al.
  (Continued)

FOREIGN PATENT DOCUMENTS

EP    2208572    7/2010
EP    2907621    8/2015
  (Continued)

OTHER PUBLICATIONS

Extended European Search Report, mailed Jun. 1, 2016, directed to European Patent Application No. 12887435.1; 5 pages.
  (Continued)

*Primary Examiner* — Ziaul Karim
(74) *Attorney, Agent, or Firm* — Morrison & Foerster LLP

(57) ABSTRACT

A workpiece-attachment-information reporting device includes a range-setting unit for setting a movable range in a prescribed feed-shaft direction of a work machine, a position-orientation-setting unit for setting the attachment position or orientation of a workpiece, a route-setting unit for setting a tool route on the basis of the attachment position or orientation of a workpiece, a range calculation unit for calculating the operational range in the prescribed feed-shaft direction of a work machine when the tool has moved relative to the workpiece along the tool route, a target-position-orientation calculation unit for obtaining the target attachment position or orientation of the workpiece with the calculated operational range being within the movable range, and a reporting unit for reporting the target attachment position or orientation.

3 Claims, 12 Drawing Sheets

(51) Int. Cl.
*B23Q 15/013* (2006.01)
*G05B 19/4068* (2006.01)

(58) Field of Classification Search
USPC .......................................................... 700/114
See application file for complete search history.

(56) References Cited

U.S. PATENT DOCUMENTS

2013/0006394 A1* 1/2013 Iuchi ................. G05B 19/4061
  700/56
2013/0253695 A1* 9/2013 Iuchi .................... G05B 19/402
  700/192

FOREIGN PATENT DOCUMENTS

| | | |
|---|---|---|
| JP | 2-18104 | 2/1990 |
| JP | 4-181304 | 6/1992 |
| JP | 5-204431 | 8/1993 |
| JP | 7-1283 | 1/1995 |
| JP | 11-90770 | 4/1999 |
| JP | 2001-92515 | 4/2001 |
| JP | 2002-312009 | 10/2002 |
| JP | 2012-161861 | 8/2012 |
| WO | WO-2011/111088 | 9/2011 |
| WO | WO-2012/101789 | 8/2012 |

OTHER PUBLICATIONS

International Search Report mailed Jan. 29, 2013, directed towards International Application No. PCT/JP2012/078056, 2 pages.

* cited by examiner

WORKPIECE-ATTACHMENT-INFORMATION REPORTING DEVICE

CROSS-REFERENCE TO RELATED APPLICATIONS

This application is a U.S. National Phase patent application of International Patent Application No. PCT/JP2012/078056, filed on Oct. 30, 2012, which is hereby incorporated by reference in the present disclosure in its entirety.

FIELD OF THE INVENTION

The present invention relates to a workpiece-attachment-information reporting device which reports attachment information of a workpiece to deal with stroke-over of a machine tool.

BACKGROUND OF THE INVENTION

When controlling a machine tool by an NC device based on a processing program so as to process a workpiece which is fastened to a table, sometimes a situation ends up arising where the position instructed to the linear feed axis or rotational feed axis of the machine tool ends up outside of the actual movable range of the feed axis (called "stroke-over"). To deal with such stroke-over, in the past, there has been known a system which, when a table rotation command which would result in stroke-over at the linear feed axis is output during path control of the front end point of the tool, maintains the distance between the front end point of the tool and the center of the table rotation constant from the start of table rotation to the end of table rotation while making the tool retract to thereby try to avoid the stroke-over (for example, see PLT 1).

However, with a system such as described in PLT 1 where the tool is made to retract to try to avoid stroke-over, it is difficult to smoothly process the entire area of the workpiece based on a processing program.

PLT 1: International Publication No. 2011/111088A

SUMMARY OF THE INVENTION

A workpiece-attachment-information reporting device according to one aspect of the present invention comprises a range setting unit which sets a movable range of a machine tool in a predetermined feed axis direction, a position/posture setting unit which sets a mounting position or posture of the workpiece mounted on a workpiece mounting surface of the machine tool, a path setting unit which sets a tool path based on the mounting position or posture of the workpiece set at the position/posture setting unit, a range calculating unit which calculates an operating range of the machine tool in the predetermined feed axis direction when assuming that the tool moves relative to the workpiece along the tool path set at the path setting unit, a target position/posture computing unit which finds the target mounting position or posture of the workpiece by which the operating range calculated by the range calculating unit becomes within the movable range set at the movable range setting unit, and a reporting part which reports the target mounting position or posture found by the target position/posture computing unit.

DETAILED DESCRIPTION OF THE INVENTION

Figure 1:
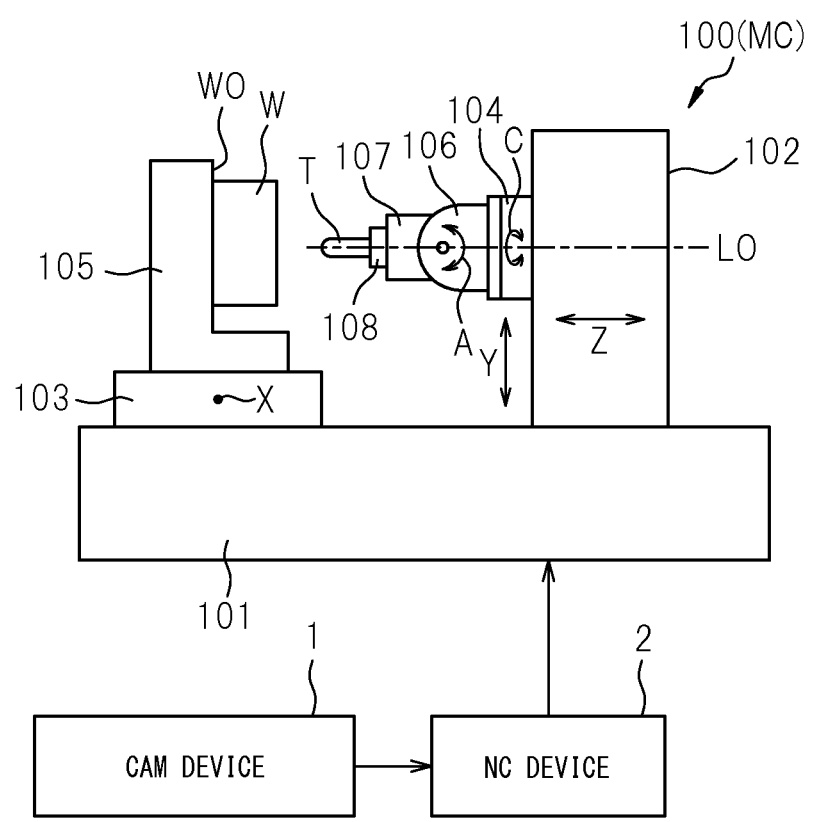
FIG. 1 is a view which shows one example of a machine tool to which a workpiece-attachment-information reporting device according to an embodiment of the present invention is applied.

Below, referring to FIG. 1 to FIG. 14, an embodiment of a workpiece-attachment-information reporting device according to the present invention will be explained. FIG. 1 is a view which shows one example of a machine tool MC to which a workpiece-attachment-information reporting device according to an embodiment of the present invention is applied.

The machine tool 100 which is shown in FIG. 1 is a five-axis horizontal machining center in which a tool T extends along a horizontal direction axial line L0. In FIG. 1, a horizontal direction parallel to the axial line L0 is defined as the "Z-axial direction" (front-back direction), a horizontal direction vertical to the Z-axial direction is defined as the "X-axial direction" (left-right direction), and a vertical direction is defined as the "Y-axial direction" (up-down direction).

As shown in FIG. 1, the machine tool 100 has a bed 101 which is fastened to the floor, a column 102 which is provided standing on the top surface of the bed 101 to be able to move in the horizontal direction (Z-axial direction), a table 103 which is provided in front of the column 102 to be able to move on the top surface of the bed 101 in the horizontal direction (X-axial direction), and a spindle table 104 which is provided on the front surface of the column 102 to be able to move in the up-down direction (Y-axial direction). On the top surface of the table 103, a right angle plate 105 is attached. At the back surface of the right angle plate 105, that is, a workpiece mounting surface W0, a workpiece W is fastened.

At the spindle table 104, a swivel base 106 which can rotate about a rotational feed axis (C-axis) direction centered about the Z-axis is attached. The swivel base 106 has a pair of arm parts which are arranged separated from each other in the left-right direction. Between the left-right pair of arm parts, a spindle head 107 is supported to be able to rotate about a rotational feed axis (A-axis) vertical to the C-axis. The spindle head 107 supports the spindle 108 to be able to rotate. At the front end part of the spindle 108, the tool T is attached. The tool T is for example a ball end mill with a semispherical front end part.

The table 103, spindle table 104, and column 102 move by respective linear feed mechanisms in the X-axial direction, Y-axial direction, and Z-axial direction. The linear feed mechanisms are, for example, comprised of ball screws, servo motors which drive rotation of the ball screws (X-axis use servo motor, Y-axis use servo motor, and Z-axis use servo motor), etc. The spindle head 107 and swivel base 106 respectively rotate about the A-axial direction and C-axial direction by drive operation of the servo motors (A-axis use servo motor and C-axis use servo motor). Due to this, the workpiece W moves relative to the tool T and processes the workpiece W with the tool T in a desired processing posture.

The drive operations of the X-axis servo motor, Y-axis servo motor, Z-axis servo motor, A-axis servo motor, and C-axis servo motor and the drive operation of the spindle drive spindle motor are controlled by an NC (numerical control) device 2. That is, NC device 2 outputs control signals to these servo motors and spindle motor in accordance with a processing program which is output from the CAM (computer aided manufacturing) device so as to control the operation of the machine tool 100.

Figure 2:
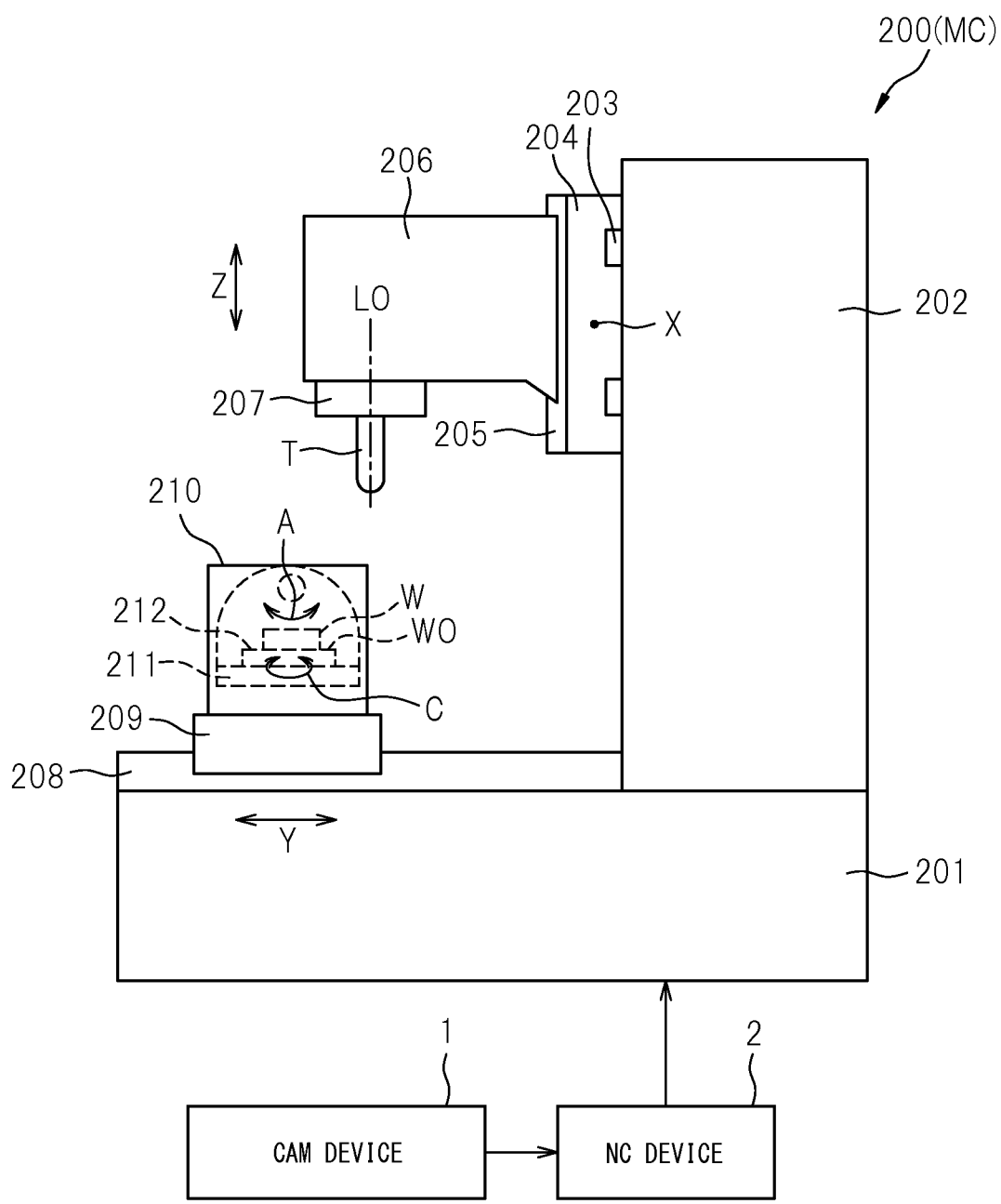
FIG. 2 is a view which shows another example of a machine tool to which a workpiece-attachment-information reporting device according to an embodiment of the present invention is applied.

FIG. 2 is a view which shows one example of another machine tool MC to which a workpiece-attachment-information reporting device according to an embodiment of the present invention is applied. The machine tool 200 which is shown in FIG. 2 is a five-axis vertical machining center where the tool T extends along the vertical direction axial line L0. In FIG. 2, the vertical direction parallel to the axial line L0 is defined as the "Z-axial direction" (up-down direction), the horizontal direction vertical to the Z-axial direction is defined as the "X-axial direction" (left-right direction), and the horizontal direction vertical to the X-axial direction is defined as the "Y-axial direction" (front-back direction).

As shown in FIG. 2, the machine tool 200 is provided with a bed 201, a column 202 which is provided standing on the bed 201, a spindle table 204 which can move in the X-axial direction along a guide rail 203 which is provided on the column 202, a spindle head 206 which can move in the Z-axial direction along a guide rail 205 which is provided on the spindle table 204, and a spindle 207 which is supported at the spindle head 206 to be able to rotate and has a tool T attached to it. The bed 201 is provided with a saddle 209 which can move along the guide rail 208 in the Y-axial direction. On the saddle 209, a trunnion 210 which has a pair of side walls which are separated from each other in the X-axial direction is fastened. Between the pair of side walls, a table swivel base 211 is provided to be able to rotate about a rotational feed axis (A-axis) centered on the X-axis. On the table swivel base 211, a table 212 is attached which can rotate about a rotational feed axis (C-axis) centered on the Z-axis. The workpiece W is fastened on the workpiece mounting surface W0 of the table 212.

The spindle table 204, saddle 209, and spindle head 206 move in the X-axial direction, Y-axial direction, and Z-axial direction by respective linear feed mechanisms which have ball screws and servo motors which drive rotation of the ball screws. The table swivel base 211 and table 212 are driven by respective servo motors to rotate in the A-axial direction and C-axial direction. The drive operations of these servo motors and the drive operation of the spindle motor for driving the spindle are controlled by the NC device 2 in accordance with the processing program which is output from the CAM device 1.

Figure 3A:
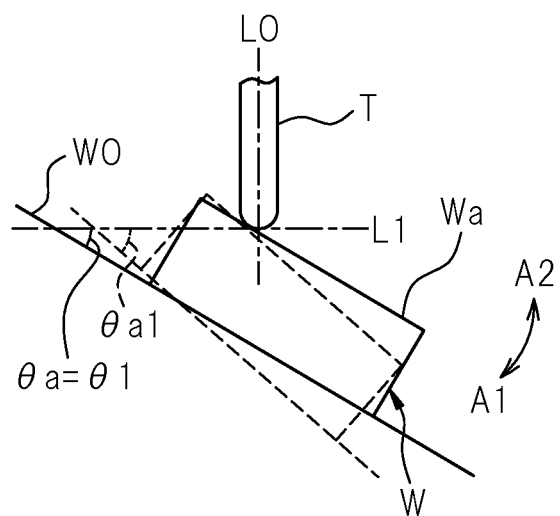
FIG. 3A is a view which explains problem points due to stroke-over in the A-axial direction.
Figure 3B:
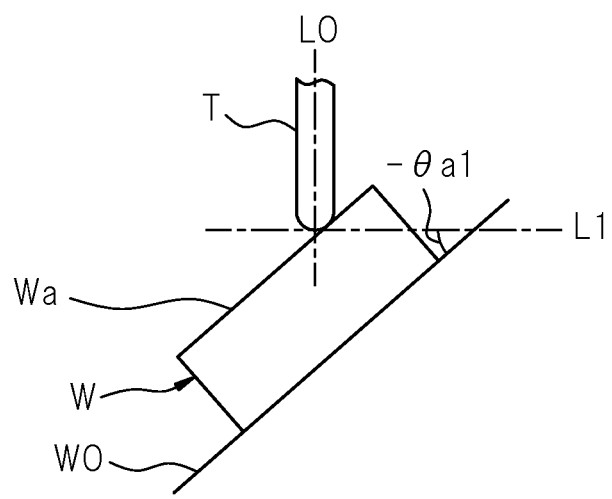
FIG. 3B is a view which explains problem points due to stroke-over in the A-axial direction.

The above machine tools MC have movable ranges distinctive to the machine in the X-axial direction, Y-axial direction, Z-axial direction, and A-axial direction feed axis directions. If a movement command value of the machine tool MC by the processing program exceeds such a movable range (this being called "stroke-over"), the following such problem occurs. Note that, the C-axis can rotate 360°, so stroke-over does not occur. FIG. 3A and FIG. 3B are views which explain the problem points due to stroke-over in the A-axial direction.

The solid line of FIG. 3A shows the state where the workpiece W (workpiece mounting surface W0) is made to rotate to the maximum relative to the tool T in the A-axial direction which is shown by the arrow mark A1. At this time, the angle θa which is formed by the reference line L1 vertical to the axial line L0 of the tool T and the workpiece mounting surface W0 is θ1 (for example, 30°), while angle θa is assumed to be able to be changed to θ2 (for example, −120°) to the opposite side of the A1 direction (arrow A2 direction). In this case, the movable range of the machine tool in the A-axial direction is θ1 to θ2.

Here, assume processing giving an angle θa which is formed between the reference line L1 and the workpiece mounting surface W0 of θa1 (for example, 45°), that is, the processing posture of the tool T which is shown by the broken line in FIG. 3A, is instructed. At this time, θa1 exceeds the movable range θ1 to θ2 of the machine tool in the A-axial direction (stroke-over), so the workpiece mounting surface W0 cannot be made to rotate relatively in the arrow mark A1 direction to make the angle θa which is formed with the reference line L1 θa1. Therefore, the NC device 2, for example, as shown in FIG. 3B, outputs a processing command so as to make the workpiece mounting surface W0 rotate relatively by exactly 180° in the C-axial direction centered about the axial line L0 and so that the angle θa which is formed between the reference line L1 and the workpiece mounting surface W0 becomes −θa1.

In this case, the workpiece W rotates relatively in the C-axial direction and A-axial direction with the tool T remaining in contact with the workpiece surface Wa, so the tool T is liable to cut into the workpiece surface Wa. As a result, processing marks are formed at the workpiece surface Wa and formation of a good processed surface becomes difficult. Such stroke-over in the A-axial direction can sometimes be eliminated by changing the mounting posture of the workpiece W as shown below.

Figure 4:
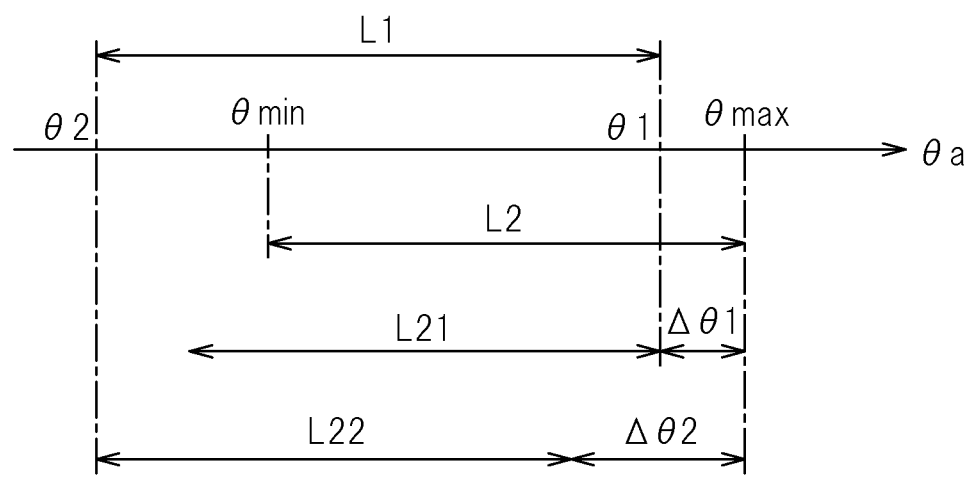
FIG. 4 is a view which shows the relationship between a movable range of a machine tool in the A-axial direction and an operating range in the A-axial direction which is instructed by the processing program.

FIG. 4 is a view which shows the relationship between a movable range of the machine tool MC in the A-axial direction and an operating range in the A-axial direction which is instructed by the processing program. In the figure, L1 (θ2≤θa≤θ1) is the movable range of the machine tool MC, while L2 (θmin≤θa≤θmax) is the operating range which is instructed by the processing program. As shown in FIG. 4, L2 exceeds L1 in the range of θ1<θa≤θmax. In this range, stroke-over occurs. If making the workpiece W rotate relatively from this state from the workpiece mounting surface W0 in the A-axial direction (FIG. 3A, arrow mark A1 direction) by exactly a predetermined angle Δθ1 (=θmax−θ1), the operating range L2 becomes L21. If making it rotate relatively by exactly a predetermined angle Δθ2 (=θmin−θ2), the operating range L2 becomes L22. Therefore, by making the workpiece W rotate relatively in the A-axial direction in the range of Δθ1 to Δθ2, it is possible to make the operating range L2 of the processing program shift to the inside in the movable range L1.

Figure 5:
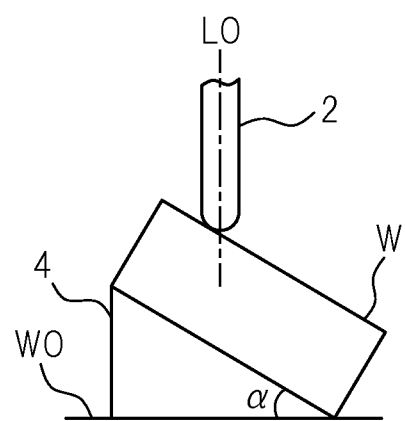
FIG. 5 is a view which shows an example where a workpiece is mounted to a workpiece mounting surface rotated relative to it by exactly a predetermined angle α in the A-axial direction.

It is possible to change the mounting posture of the workpiece W in the A-axial direction using a fixture. FIG. 5 is a view which shows an example of the workpiece W being made to rotate relative to the workpiece mounting surface W0 in the A-axial direction (FIG. 3, arrow mark A1 direction) by exactly a predetermined angle α and mounted. Between the workpiece mounting surface W0 and the workpiece W, a fixture 4 which has a slanted surface of a predetermined angle α is interposed. The angle α, for example, corresponds to Δθ1 of FIG. 4. Due to this, the operating range L2 of the processing program shifts to L21 of FIG. 4 and stroke-over in the A-axial direction can be eliminated.

When using a fixture 4 in this way to eliminate stroke-over in the A-axial direction, it is preferable to report to the user how to change the mounting posture of the workpiece W, that is, the attachment information of the workpiece W. Therefore, in this embodiment, the mounting posture of the workpiece W which eliminates stroke-over (called "target mounting posture") is reported to the user, so the workpiece-attachment-information reporting device is configured in the following way.

Figure 6:
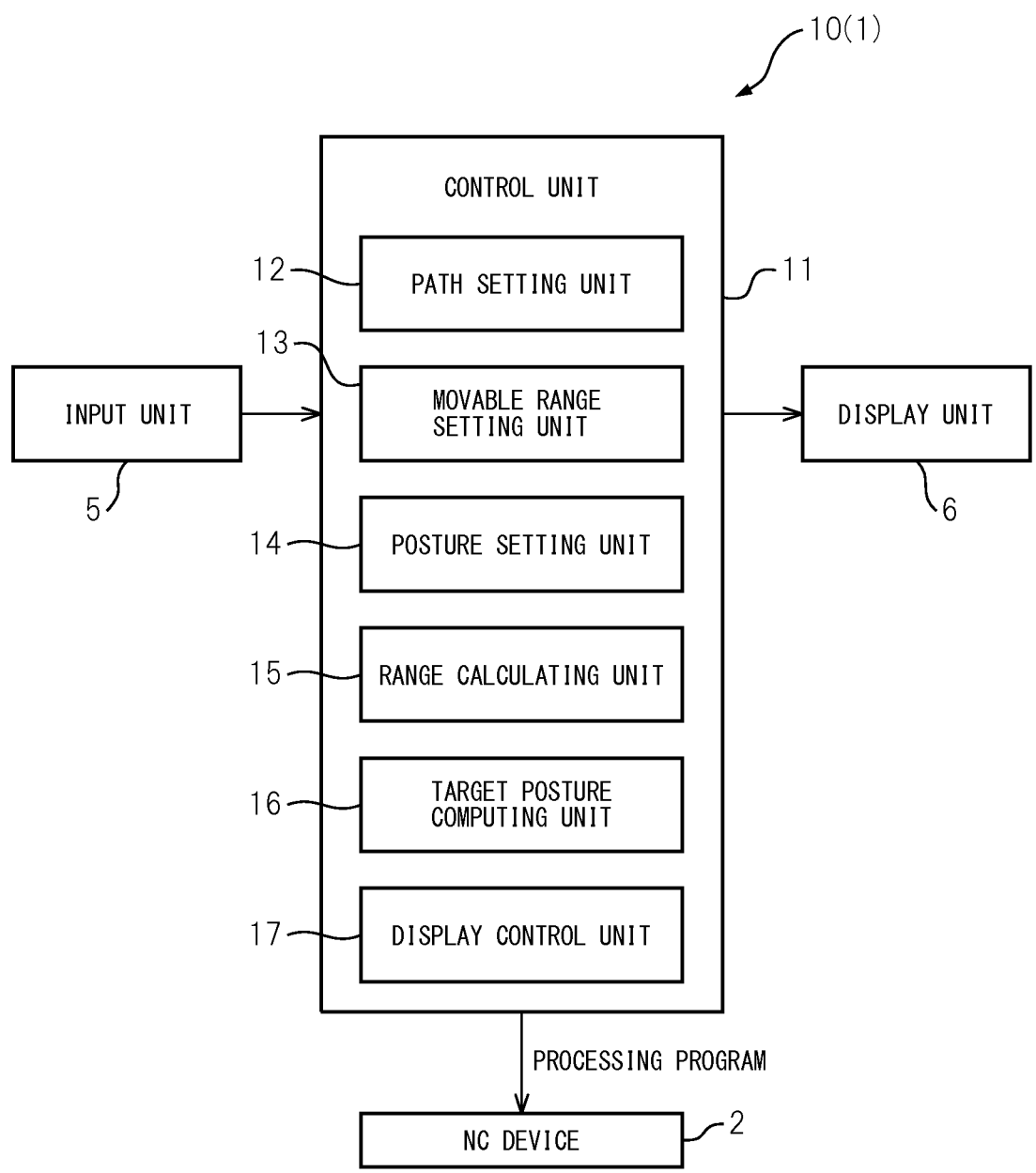
FIG. 6 is a block diagram which shows the schematic configuration of a workpiece-attachment-information reporting device according to an embodiment of the present invention.

FIG. 6 is a block diagram which shows the schematic configuration of a workpiece-attachment-information reporting device 10 according to the present embodiment and shows an example where the workpiece-attachment-information reporting device 10 is configured by the CAM device 1. As shown in FIG. 6, the workpiece-attachment-information reporting device 10 has an input unit 5 and a display unit 6 centered about the control unit 11. From the input unit 5, shape data of the workpiece W, shaft configuration data configuring the feed axes of the machine tool MC, the movable range data of the different feed axes and other various types of information required for processing at the control unit 11 are input.

The control unit 11 is configured by a processing device which has a CPU, ROM, RAM, and other peripheral circuits etc. and functionally has a path setting unit 12, movable range setting unit 13, posture setting unit 14, range calculating unit 15, target posture computing unit 16, and display control unit 17.

The path setting unit 12 uses the shape data of the workpiece W which is input through the input unit 5 (for example, CAD data) as the basis to generate a tool path for processing the workpiece W. The tool path can be obtained by successively connecting the processing points on the workpiece surface. The tool path data includes position data of processing points expressed by the position vector (x, y, z) of the front end part of the tool and the posture vector (i, j, k) of the tool T. The path setting unit 12, if changing the mounting posture (slant) of the workpiece W to the workpiece mounting surface W0, changes the posture vector of the tool T accordingly and generates a new tool path. Note that, the tool path before changing the workpiece mounting posture will be referred to here as a "reference tool path".

The movable range setting unit 13 sets the movable range of the machine tool MC in the A-axial direction (FIG. 4, L1).

Figure 7:
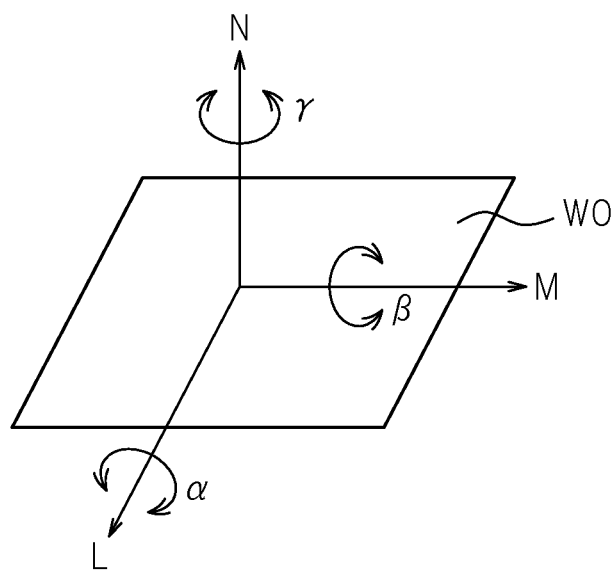
FIG. 7 is a view which explains parameters which define a workpiece mounting posture.

The posture setting unit 14 sets the mounting posture of the workpiece W using the workpiece mounting surface W0 as a reference. In the present embodiment, as shown in FIG. 7, using the workpiece mounting surface W0 as a reference, three orthogonal axes (L, M, and N) are defined. The rotational directions centered about the axes L, M, and N are respectively defined as the α (roll angle), β (pitch angle), and γ (yaw angle). The workpiece mounting posture is expressed by these α, β, and γ. The roll angle α of the workpiece W can be changed in the range from the minimum value α1 (for example, −180°) to the maximum value α2 (for example, 180°), the pitch angle β can be changed in the range from the minimum value β1 (for example, −90°) to the maximum value β2 (for example, 90°), and the yaw angle γ can be changed in the range from the minimum value γ1 (for example, −180°) to the maximum value γ2 (for example, 180°).

The workpiece mounting posture where the roll angle α, pitch angle β, and yaw angle γ are respectively 0° will be referred to here as the "reference posture". The reference tool path corresponds to the tool path which is set for the workpiece W in the reference posture. The posture setting unit 14 sets not only the mounting posture of the workpiece W, but also the mounting position of the workpiece W on the workpiece mounting surface W0. For example, on the workpiece mounting surface W0, a workpiece origin coordinate serving as the reference for the reference posture, that is, the mounting position of the workpiece W, is set.

The range calculating unit 15 calculates the operating range of the machine tool MC in the A-axial direction (FIG. 4, L2) when assuming that the tool T has moved relatively along the tool path set at the path setting unit 12. If changing the workpiece mounting posture, the operating range L2 also changes. That is, as shown in FIG. 4, the operating range L2 shifts. This operating range L2 is calculated regardless of the actual movable range L1 of the machine tool MC.

The target posture computing unit 16 finds the target mounting posture of the workpiece W so that the operating range L2 which has been calculated by the range calculating unit 15 becomes within the movable range L1 which has been set at the movable range setting unit 15. Specifically, the posture setting unit 14 makes the roll angle α, pitch angle β, and yaw angle γ respectively change from the minimum values α1, β1, and γ1 to the maximum values α2, β2, and γ2 by a respective predetermined angle increment Δα, Δβ, or Δγ so as to change the workpiece mounting posture, and the range calculating unit 15 calculates the operating ranges L2 corresponding to these workpiece mounting postures. Further, the target posture computing unit 16 judges if the operating ranges L2 are within the movable ranges L1 and converts the roll angle α, pitch angle β, and yaw angle γ which are within the movable ranges to the A-axis and C-axis of the machine tool MC. Due to this, the range of the A-axis for making the operating range L2 within the movable range L1, that is, the target mounting posture of the workpiece W, is found.

Figure 8:
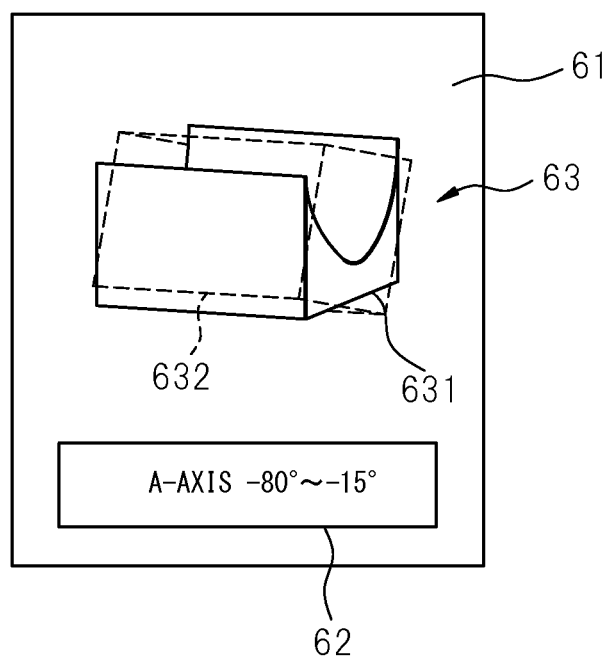
FIG. 8 is a view which shows one example of a display image which is displayed at a display unit of FIG. 6.

The display control unit 17 displays the target mounting posture of the workpiece W which has been found at the target posture computing unit 16 on the display unit 6. FIG. 8 is a view which shows one example of a display screen 61 which is displayed at the display unit 6. The display screen 61 has a display part 62 which displays the target mounting posture of the workpiece W by numerical values and a display part 63 which displays the target mounting posture of the workpiece W by graphics. In FIG. 8, the range of angle of the A-axis which is displayed at the display part 62 is −80° to −15°. The display part 63 shows a workpiece image 631 which shows the workpiece W at the reference posture by a solid line and shows a workpiece image 632 which shows the workpiece W at the target mounting posture which is closest to the reference posture (in this example, −15°) by a broken line. Note that, to clearly differentiate the workpiece image 631 and the workpiece image 632, the solid line and broken line may also be displayed by different colors.

Due to this, the user can easily obtain a grasp of the mounting posture of the workpiece W in the A-axial direction for avoiding stroke-over. In this case, the mounting posture of the workpiece W which is closest to the reference posture is displayed by the broken line, so the slant of the workpiece W on the workpiece mounting surface through the fixture 4 can be made the minimum.

Figure 9:
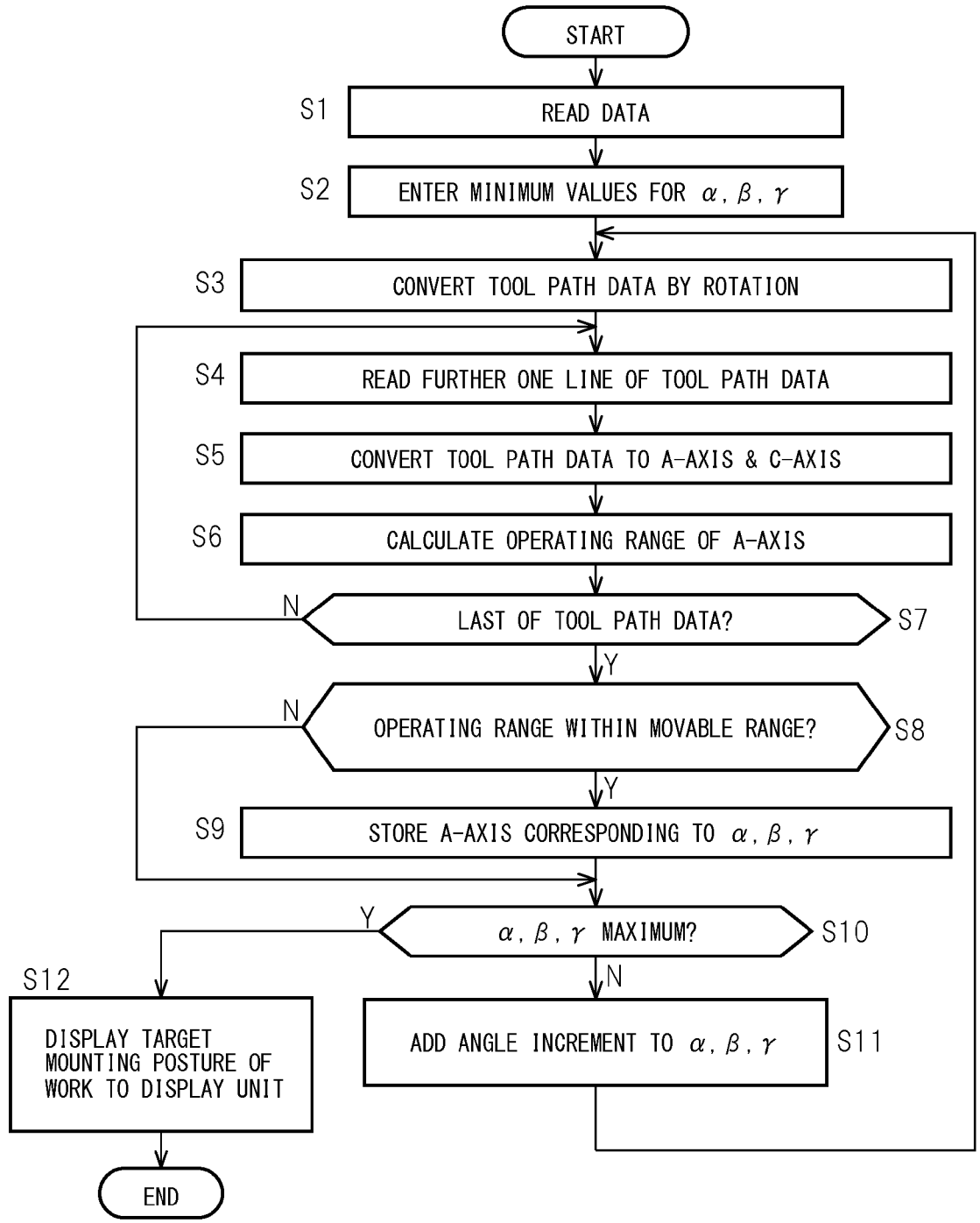
FIG. 9 is a flow chart which shows one example of processing which is performed by a control unit of FIG. 6.

The processing which is performed by the control unit 11 will be explained more specifically. FIG. 9 is a flow chart which shows one example of the processing which is performed by the control unit 11. The processing which is shown in this flow chart is, for example, started when the start of calculation of the target mounting posture of the workpiece W is instructed by operation of the input unit 5.

At step S1, the tool path data which has been set at the path setting unit 12 is read and the axis configuration data, movable range data, etc. of the machine tool which were set in advance through the input unit 5 are read. At step S2, for the pitch angle α, roll angle β, and yaw angle γ, the minimum values α1, β1, and γ1 are entered as initial values. At step S3, the posture vector (i, j, k) in the tool path data are converted using α, β, and γ by the following formula (I) to the posture vector (i', j', k'). That is, along with a change in the mounting posture of the workpiece W, the posture vector of the tool T is converted and new tool path data is generated.

$$\begin{bmatrix} i' \\ j' \\ k' \end{bmatrix} = \begin{bmatrix} \cos\gamma & 0 & \sin\gamma \\ 0 & 1 & 0 \\ -\sin\gamma & 0 & \cos\gamma \end{bmatrix} \begin{bmatrix} 1 & 0 & 0 \\ 0 & \cos\beta & -\sin\beta \\ 0 & \sin\beta & \cos\beta \end{bmatrix} \begin{bmatrix} \cos\alpha & -\sin\alpha & 0 \\ \sin\alpha & \cos\alpha & 0 \\ 0 & 0 & 1 \end{bmatrix} \begin{bmatrix} i \\ j \\ k \end{bmatrix} \quad [\text{I}]$$

At step S4, the converted tool path data is read for one further row. In each row of the tool path data, the position data of a different processing point (x, y, z, i', j', k') is written. By reading one further row of the tool path data, the position data of the next processing point is read. At step S5, the posture vector (i', j', k') of the read tool path data is converted to the rotation axis command θa, θc of the A-axis and C-axis of the machine tool MC.

At step S6, the operating range L2 of the A-axis (minimum value θmin and maximum value θmax of FIG. 4) are calculated. At step S7, it is judged if the tool path data has been read up to the end. If yes at step S7, the routine proceeds to step S8, while if no, the routine returns to step S4 where similar processing is repeated.

If the processing of step S6 is first performed, the value θa of the A-axis which has been found in the immediately preceding step S5 becomes the minimum value θmin and the maximum value θmax. After that, each time the tool path data is read at step S4, the value θa of the A-axis is calculated at step S5. At step S6, the relative size of this θa and the already set minimum value θmin and maximum value θmax is judged. Further, when, at step S6, θa is smaller than θmin, θa is made the minimum value θmin to update the minimum value θmin, while when θa is larger than θmax, θa is made the maximum value θmax to update the maximum value θmax. This processing is repeated over the entire tool path data to finally calculate the operating range L2 of the A-axis.

At step S8, it is judged if the operating range L2 of the A-axis which has been calculated at step S7 is within the movable range L1 of the A-axis of the machine tool MC, that is, if stroke-over has occurred. If yes at step S8, the routine proceeds to step S9, while if no, the routine bypasses step S9 and proceeds to step S10. At step S9, the value θa of the A-axis which corresponds to the workpiece posture for calculating the operating range L2, that is, the value θa corresponding to the roll angle α, pitch angle β, and yaw angle γ, is calculated. This θa is stored as the target mounting posture in the memory. Note that, at this time, the angle θc of the C-axis corresponding to α, β, and γ is simultaneously calculated, but there is no need to store θc for preventing stroke-over for the C-axis.

At step S10, it is judged if the roll angle α, pitch angle β, and yaw angle γ are the maximum values α2, β2, and γ2. If no at step S10, the routine proceeds to step S11, the predetermined angle increment Δα, Δβ, or Δγ is added to the roll angle α, pitch angle β, or yaw angle γ, and the workpiece mounting posture is changed. Next, the routine returns to step S3 where similar processing is repeated. The workpiece mounting posture is gradually changed each time the processing of step S11 is repeated. At step S11, for example, first, the angle increment Δα is added to the roll angle α, when the roll angle α becomes the maximum value α2, next, the angle increment Δβ is added to the pitch angle β to return the roll angle α to the minimum value α1 and processing for adding the angle increment Δα to the roll angle α is returned to. Further, when the pitch angle β becomes the maximum value β2, next, the angle increment Δγ is added to the yaw angle γ to return the pitch angle β to the minimum value β1 and the roll angle α to the minimum value α1 and processing to add the angle increment Δα to the roll angle α is returned to. By repeating this, the workpiece mounting posture is gradually changed until the roll angle α, pitch angle β, and yaw angle γ respectively become the maximum values α2, β2, and γ2. By the processing of step S3 to step S11 being repeated, at step S9, a plurality of values θa of the A-axis which show the target mounting posture are stored.

If yes at step S10, the routine proceeds to step S12 where the display unit 6 is made to display a target mounting posture of the workpiece W. That is, as shown in the display part 62 of FIG. 8, the plurality of values θa of the A-axis which have been stored at step S9 is displayed as a range of angles. Furthermore, as shown by the display part 63 of FIG. 8, the workpiece image 631 which shows the reference posture of the workpiece W is displayed by a solid line, while the workpiece image 632 which shows the target mounting posture by which the change in posture becomes the minimum is displayed by a broken line. Note that, when there is no value θa of the A-axis which shows the target mounting posture, a message to the effect that there is no workpiece mounting posture which can eliminate stroke-over etc. is displayed at the display unit 6. Due to the above, processing at the control unit 11 is ended.

According to the present embodiment, the following such operations and effects can be exhibited.

(1) The workpiece-attachment-information reporting device 10 according to the present embodiment (control unit 11) is provided with a movable range setting unit 13 which sets a movable range L1 of a machine tool MC in the A-axial direction, a posture setting unit 14 which sets a mounting position (workpiece origin coordinate position) and posture of a workpiece W which is mounted on a workpiece mounting surface W0 of the machine tool MC, a path setting unit 12 which sets a tool path based on the set workpiece mounting posture, a range calculating unit 15 which calculates an operating range L2 of the machine tool MC in an A-axial direction when assuming a tool T moves relatively to the workpiece W along the set tool path, a target posture computing unit 16 which finds a target mounting posture of the workpiece W whereby the calculated operating range L2 becomes within the movable range L1, and a display control unit 17 which displays the found target mounting posture at the display unit 6. Due to this, the user can obtain a grasp of the workpiece mounting posture which avoids stroke-over and can smoothly process the entire area of a workpiece while avoiding stroke-over when processing the workpiece.

(2) The target mounting posture of the workpiece W is displayed at the display unit 6, so the user can easily grasp how to change the workpiece mounting posture.

(3) The posture setting unit 14 changes the roll angle $\alpha$, pitch angle $\beta$, and yaw angle $\gamma$ by the respective predetermined angle increments $\Delta\alpha$, $\Delta\beta$, and $\Delta\gamma$ to set a plurality of mounting postures of the workpiece W (step S11), the path setting unit 12 sets tool paths corresponding to the thus set plurality of mounting postures (step S3), the range calculating unit 15 calculates the operating ranges L2 in the A-axial direction corresponding to the thus set tool paths (step S6), and the target posture computing unit 16 judges if the thus calculated operating ranges L2 are within the movable range L1 which has been set at the movable range setting unit 13 to thereby find the target mounting posture of the workpiece W (step S8, step S9). Due to this, it is possible to obtain a plurality of target mounting postures and possible to give a range of the angle θa of the A-axis corresponding to the target mounting posture for display on the display unit 6. Therefore, the user need only determine the workpiece mounting posture within the displayed range. The extent of selection of the workpiece mounting posture is broad, so the user friendliness is good.

(4) The workpiece-attachment-information reporting device 10 of the present embodiment is comprised of the CAM device 1 which generates a tool path (reference tool path), so it is possible to generate a tool path, then immediately find the target mounting posture of the workpiece W which avoids stroke-over.

Figure 10A:
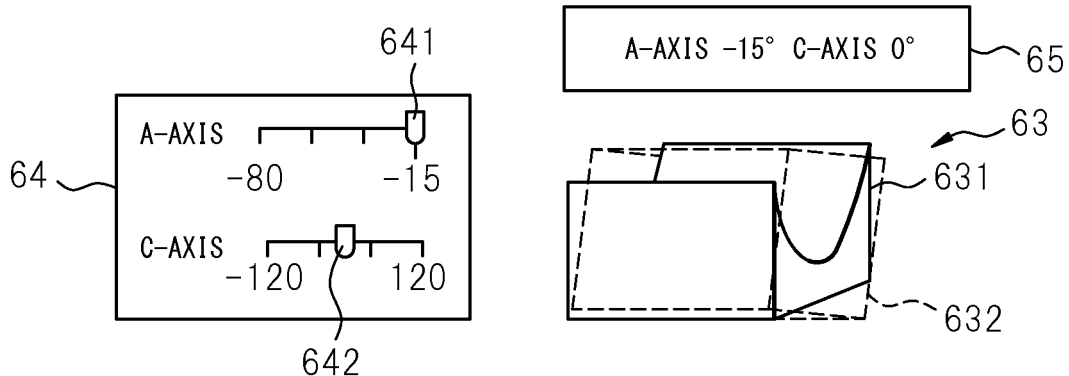
FIG. 10A is a view which shows a modification of FIG. 8.
Figure 10B:
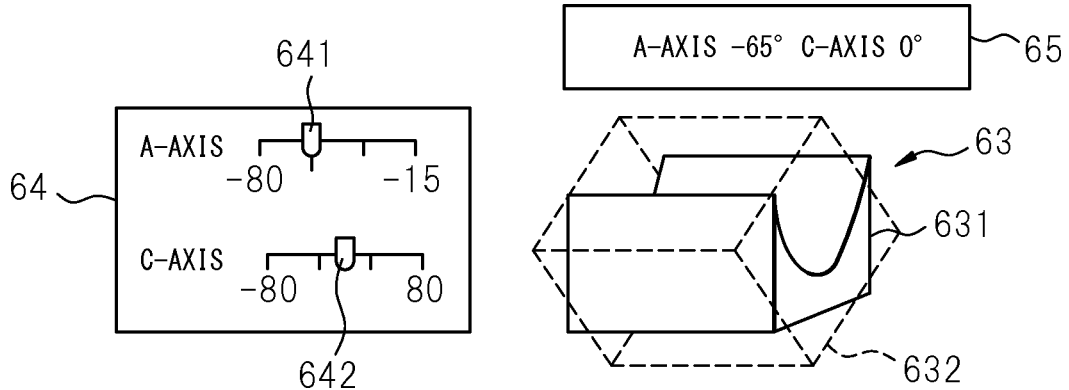
FIG. 10B is a view which shows a modification of FIG. 8.
Figure 10C:
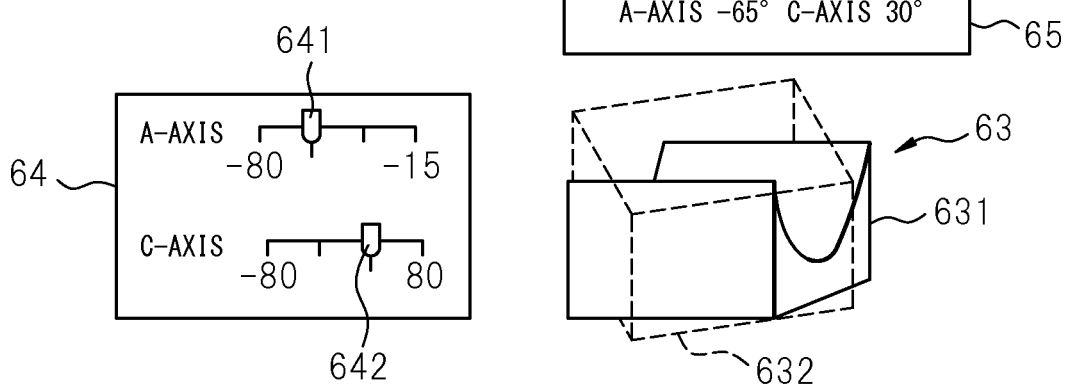
FIG. 10C is a view which shows a modification of FIG. 8.

In the above embodiment, the range of angle of the A-axis corresponding to the target mounting posture of the workpiece W was displayed, but considering the case of avoiding stroke-over by adjusting the angles of the two rotational axes of the A-axis and C-axis, it is also possible to also display the range of angle of the C-axis. In this case, for example, it may be assumed that the A-axis is set to a value in the range of angle displayed on the display part 62 (FIG. 8) and similar processing may be performed as explained above for the C-axis so as to calculate the range of angle of the C-axis and display it at the display unit 6. FIG. 10A to FIG. 10C are views which shown one example of the display screen 61 in this case.

FIG. 10A shows an example of setting the A-axis to −15°. In the figure, the display part 64 displays the ranges of angles of the A-axis and C-axis by a scale. Here, the range of angle of the A-axis which avoids stroke-over is −80° to −15°, while the range of angle of the C-axis when setting the A-axis to −15° becomes −120° to 120°. The display part 64 is provided with setting bars 641, 642 which can be operated by the user. By operation of the setting bars 641, 642, the set angles of the A-axis and C-axis can be changed.

The display part 65 displays the angles of the A-axis and C-axis (A-axis −15°, C-axis 0°) giving the smallest change in posture from the reference posture of the workpiece W. The display part 63 displays the workpiece images 631, 632 corresponding to the angles of the A-axis and C-axis by the solid line and broken line. The instructed values of the setting bars 641, 642 also change in accordance with the angles of the A-axis and C-axis which are displayed at the display part 65.

FIG. 10B shows an example where the setting bar 641 is operated from the state of FIG. 10A to change the set angle θa of the A-axis to −65°. At this time, the range of angle of the C-axis which is displayed at the display part 64 is changed to −80° to 80°. From among this, the angle (0°) of the C-axis which makes the change in posture of the workpiece W minimum is selected and is displayed together with the set angle (−65°) of the A-axis at the display part 65. The posture of the workpiece image 632 which is shown at the display part 63 also changes in accordance with this.

FIG. 10C shows an example of operating the setting bar 642 from the state of FIG. 10B to change the set angle θc of the C-axis to 30°. At this time, the angle θc of the C-axis which is displayed at the display part 65 changes. The display of the workpiece image 632 of the display part 63 also changes in accordance with the change of angle of the C-axis.

Figure 11:
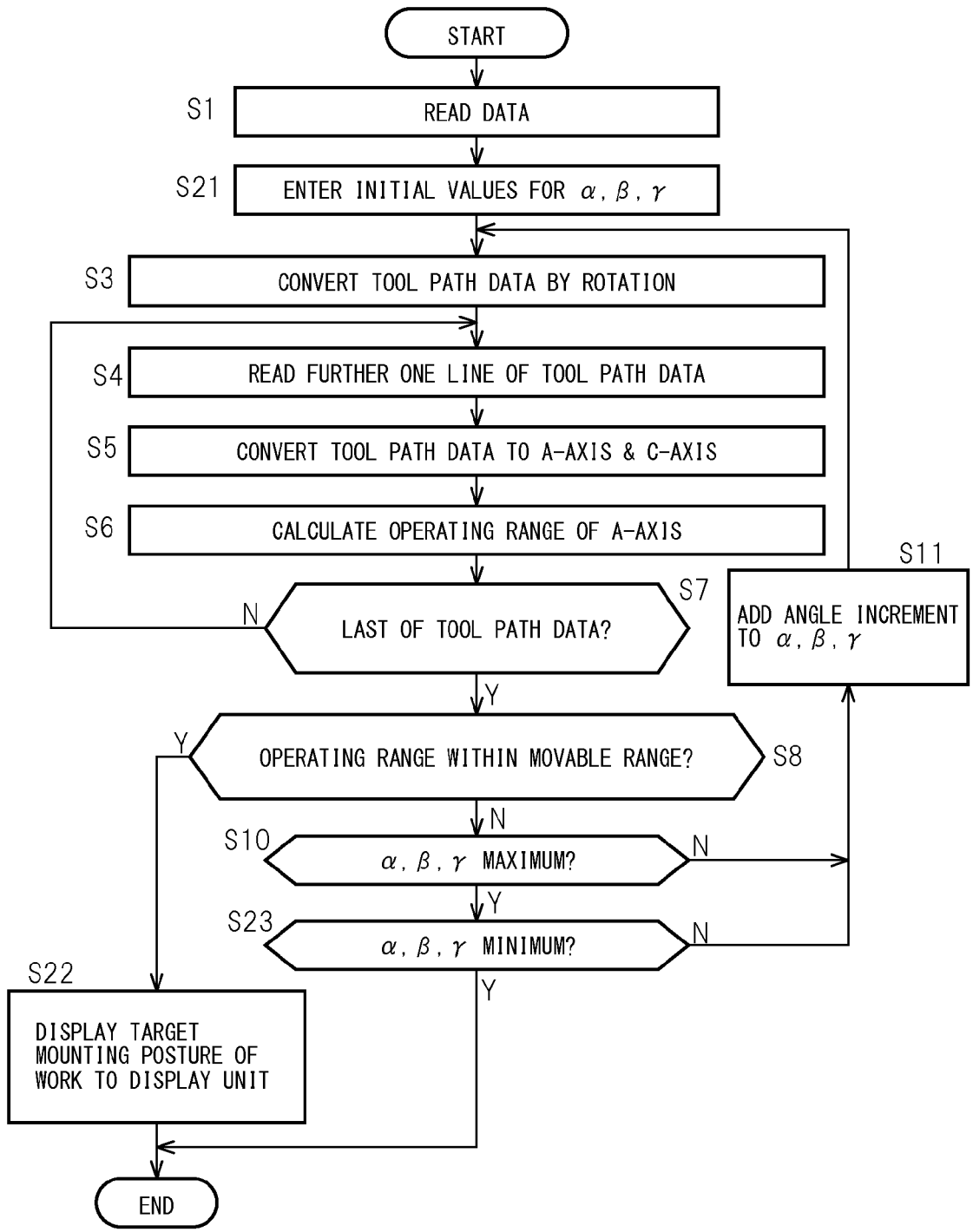
FIG. 11 is a view which shows a modification of FIG. 9.

In the above embodiment, the parameters which make the workpiece mounting posture change, that is, the pitch angle $\alpha$, roll angle $\beta$, and yaw angle $\gamma$, are made to change from the respective minimum values $\alpha1$, $\beta1$, and $\gamma1$ to the maximum values $\alpha2$, $\beta2$, and $\gamma2$ to find the range of angle of the A-axis corresponding to the target mounting posture of the workpiece W, but the processing at the control unit 11 is not limited to this. For example, it is also possible to end the processing when the angle θa of the A-axis corresponding to the target mounting posture of the workpiece W is found and to display that angle θa. FIG. 11 is a flow chart which shows on example of the processing which is performed by the control unit 11 in this case. Note that, parts which perform processing the same as in FIG. 9 are assigned the same reference notations.

As shown in FIG. 11, at step S1, data is read, then, at step S21, initial values are entered for the roll angle $\alpha$, pitch angle $\beta$, and yaw angle $\gamma$. The initial values are, for example, 0. Note that, the minimum values $\alpha1$, $\beta1$, and $\gamma1$ or the maximum values $\alpha2$, $\beta2$, and $\gamma2$ of $\alpha$, $\beta$, and $\gamma$ may also be made the initial values. After that, in the same way as FIG. 9, the processing of step S3 to step S8 is performed. At step S8, if it is judged that the operating range L2 is within the movable range L1, the routine proceeds to step S22 where the angle θa of the A-axis corresponding to $\alpha$, $\beta$, and $\gamma$ is calculated. This is output as the target mounting posture to the display unit 6, then the processing is ended. On the other hand, if step S8 is no, at step S10, it is judged if $\alpha$, $\beta$, and $\gamma$ are the maximum values $\alpha2$, $\beta2$, and $\gamma2$. If yes, the routine proceeds to step S23, while if no, the routine proceeds to step S11. At step S23, it is judged if $\alpha$, $\beta$, and $\gamma$ are the minimum values $\alpha1$, $\beta1$, and $\gamma1$. If no, the routine proceeds to step S11, while if yes, the processing is ended. In this case, for example, a message etc. to the effect of there not being a workpiece mounting posture which enables elimination of stroke-over is displayed at the display unit 6 and the processing is ended.

By ending the processing at the control unit at the state where the angle θa of the A-axis corresponding to the target mounting posture of the workpiece W is found in this way, it is possible to shorten the calculation time and possible to immediately report the target mounting posture to the user.

Figure 12:
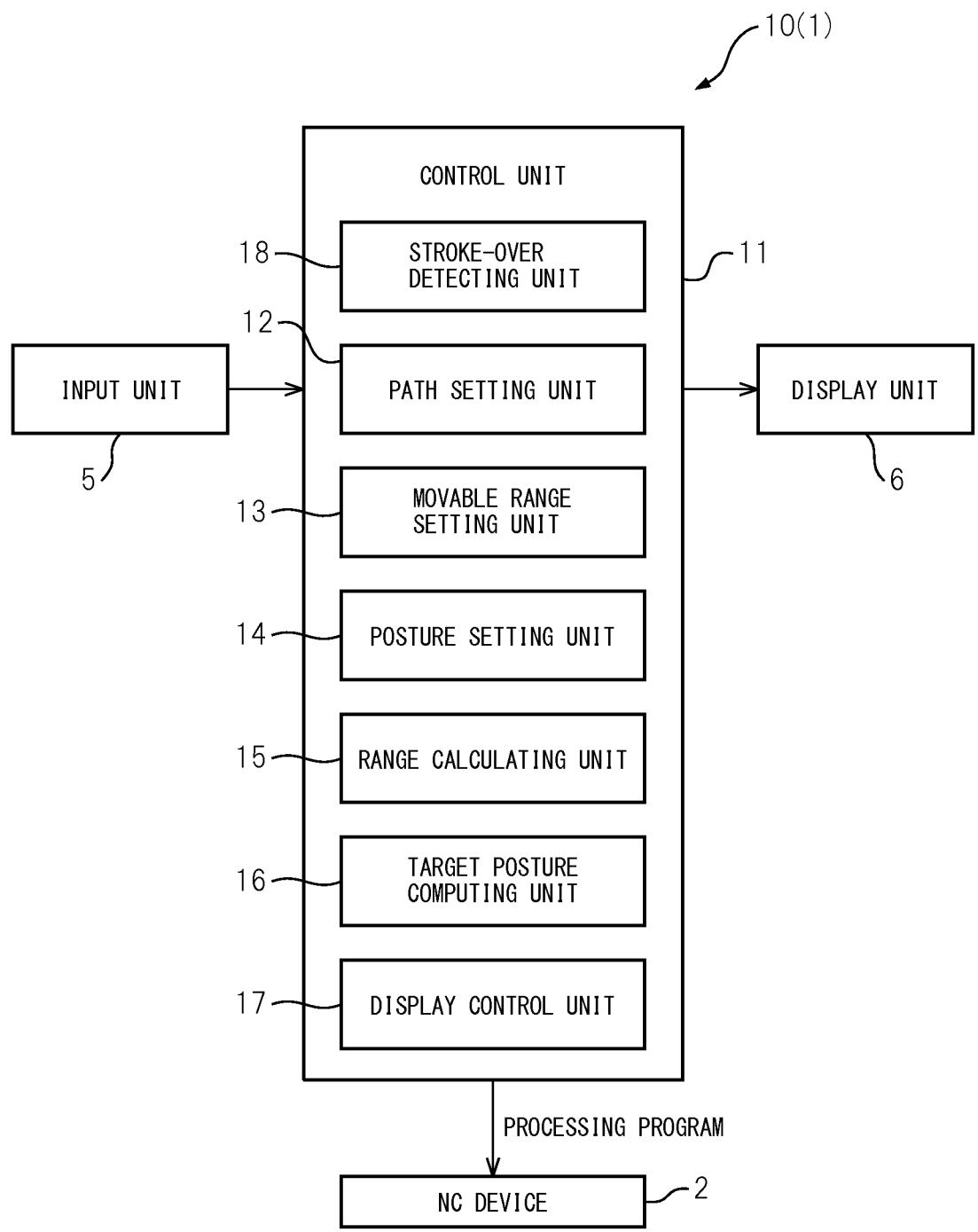
FIG. 12 is a view which shows a modification of FIG. 6.

It is also possible to assume that the workpiece has been mounted at the reference posture and detect the position of occurrence of stroke-over. FIG. 12 is a block diagram which shows the schematic configuration of the workpiece-attachment-information reporting device 10 in this case. As shown in FIG. 12, the control unit 11 has a stroke-over detecting unit 18 in addition to what is shown in functional configuration in FIG. 6. The stroke-over detecting unit 18 converts the tool path data (i, j, k) to the rotation axis command θa, θc of the A-axis and C-axis of the machine tool MC and calculates the position of the processing point where the rotation axis command θa exceed the movable range L1 of the A-axis. The thus calculated position of the processing point is the position of occurrence of stroke-over. This stroke-over occurrence position can be displayed at the display unit 6.

Figure 13:
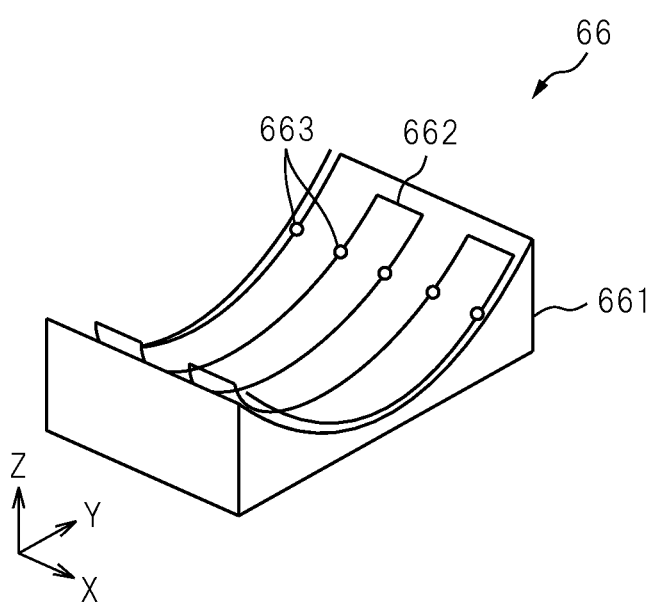
FIG. 13 is a view which shows one example of a display image which shows a stroke-over occurrence position.

FIG. 13 is a view which shows one example of a display screen which displays a stroke-over occurrence position. The display part 66 displays a workpiece image 661 which shows the processed surface of the workpiece W and a tool path image 662 which shows a tool path along the processed surface. On the tool path image 662, marks 663 which show stroke-over occurrence positions (in the figure, white circles) are displayed. Due to this, the user can confirm the position at which stroke-over occurs. Note that, the processing by the stroke-over detecting unit 18 is performed before starting the processing of FIG. 9. The processing of FIG. 9 need only be applied when stroke-over is detected.

Figure 14:
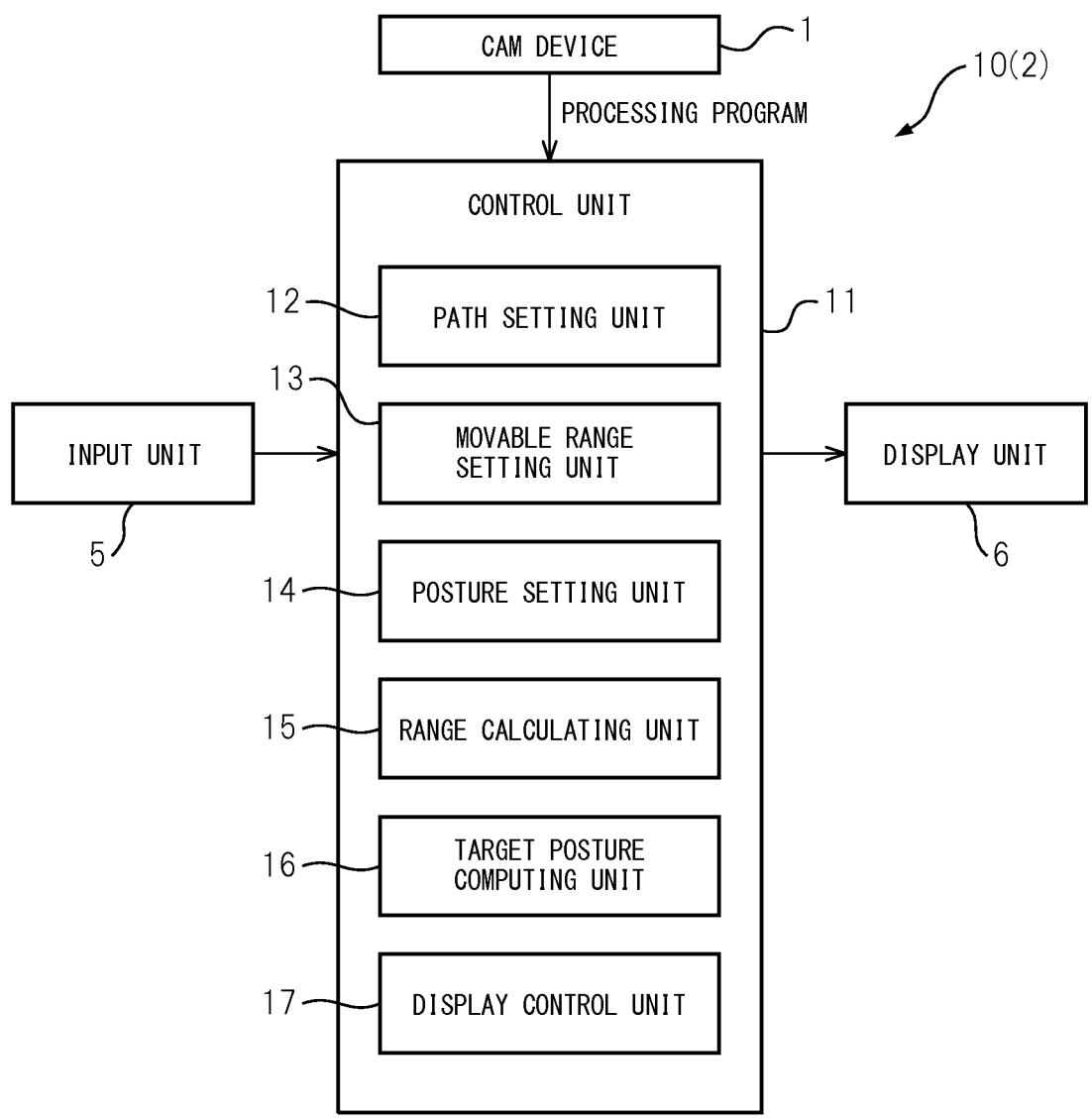
FIG. 14 is a view which shows a modification of FIG. 6.

In the above embodiment, the CAM device 1 is used to form the workpiece-attachment-information reporting device 1, but something other than the CAM device 1 may also be used to form the workpiece-attachment-information reporting device 1. FIG. 14 shows an example where an NC device 2 is used to form the workpiece-attachment-information reporting device 1. The path setting unit 12 of FIG. 14 reads a tool path (reference tool path) which is contained in the processing program from the CAM device 1 and converts this reference tool path to a tool path which corresponds to the mounting posture along with a change of the workpiece mounting posture.

Note that, in the above embodiment, the workpiece-attachment-information reporting device is applied to a five-axis machining center with rotational feed axes of the A-axis and C-axis, but may also be applied to another machine tool MC including a rotational feed axis of the B-axis. For example, when the rotational feed axes are the A-axis and B-axis, a target mounting posture of the workpiece W which simultaneously avoids stroke-overs of the A-axis and B-axis may be found and displayed at the display unit 6. A target mounting position of the workpiece W which avoids stroke-over of not only the rotational feed axes, but also linear feed axes may be found and displayed at the display unit 6. The range setting unit 13 may set the movable range L1 of any feed axis of the X-axis, Y-axis, Z-axis, A-axis, B-axis, and C-axis. Further, the present invention can be similarly applied even to a machine tool MC which does not have a rotational feed axis (for example, three-axis machining center).

When applying the present invention to a linear feed axis, the mounting position of the workpiece which is mounted to the workpiece mounting surface W0 of the machine tool MC is set, this mounting position is used as the basis for the path setting unit 12 to set the tool path, and the operating range L2 of the machine tool MC in the linear feed axis direction when assuming that the tool T moves relative to the workpiece W along this tool path is calculated. Furthermore, the target mounting position of the workpiece enabling the calculated operating range L2 to become within the movable range L1 may be found and this target mounting position displayed at the display unit 6. In this case, a position/posture setting unit (for example, posture setting unit 14) may set a mounting position of the workpiece W, a target position/posture computing unit (for example, target posture computing unit 16) may find the target mounting position of the workpiece W, and the display unit 6 may display the target mounting position of the workpiece W. Rather than display the target mounting position or posture of the workpiece W at the display unit 6, another method may be used to report these to the user. The configuration of the reporting part is not limited to the one explained above.

The above explanation is only one example. The above embodiment and modifications do not limit the present invention so far as the features of the present invention are not impaired. The component elements of the embodiment and modifications include elements which can be replaced with them and are self evidently replaced with them while maintaining unity of invention. That is, other conceivable aspects in the scope of the technical concept of the present invention are also included in the scope of the present invention. Further, it is possible to combine the above embodiment and one or more of the modifications in any way.

According to the present invention, a workpiece target mounting position or posture which enables an operating range of a machine tool in a predetermined feed axis direction to become within a movable range is found and reported to a user, so the user can easily grasp a workpiece mounting position or workpiece mounting posture which avoids stroke-over and the entire region of a workpiece can be smoothly processed based on a processing program.

1. CAM device
2. NC device
5. input unit
6. display unit
10. workpiece-attachment-information reporting device
11. control unit
12. path setting unit
13. movable range setting unit
14. posture setting unit
15. range calculating unit
16. target posture computing unit
17. display control unit
MC. machine tool

The invention claimed is:
1. A workpiece-attachment-information reporting device including a control unit comprising:
a movable range setting unit which sets a movable range of a machine tool, comprising a cutting tool, in a predetermined rotational feed axis direction;
a posture setting unit which sets a mounting posture of the workpiece mounted on a workpiece mounting surface of the machine tool;
a path setting unit which sets a tool path based on the mounting posture of the workpiece set at the posture setting unit;
a range calculating unit which calculates an operating range of the machine tool in the predetermined rotational feed axis direction when assuming that the cutting tool moves relative to the workpiece along the tool path set at the path setting unit;
a target posture computing unit which finds a plurality of target mounting postures of the workpiece by which the operating range calculated by the range calculating unit becomes within the movable range set at the movable range setting unit; and a reporting part which reports to and displays on a display unit a range of mounting postures of the workpiece which eliminates stroke-over of the predetermined rotational feed axis based on the plurality of target mounting postures found by the target posture computing unit, wherein the posture setting unit sets a plurality of mounting postures of the workpiece, the path setting unit sets tool paths corresponding to the plurality of mounting postures set at the posture setting unit, the range calculating unit calculates operating ranges in the predetermined rotational feed axis direction corresponding to the tool paths set at the path setting unit, and the target posture computing unit judges whether the operating ranges calculated at the range calculating unit are in the movable range set at the movable range setting unit so as to find the target mounting posture, and wherein the machine tool comprises a plurality of rotational feed axes, and the reporting part displays the target mounting posture to eliminate stroke-over of the rotational feed axes in an angular range in a plurality of directions.

2. The workpiece-attachment-information reporting device of claim 1, wherein the path setting unit generates a reference tool path when assuming the workpiece is mounted to a reference mounting posture and sets the tool path based on the reference tool path.

3. The workpiece-attachment-information reporting device of claim 1, wherein the path setting unit reads a reference tool path when assuming that the workpiece is mounted to a reference mounting posture and sets the tool path based on the reference tool path.

* * * * *